United States Patent Office 3,106,034
Patented Oct. 8, 1963

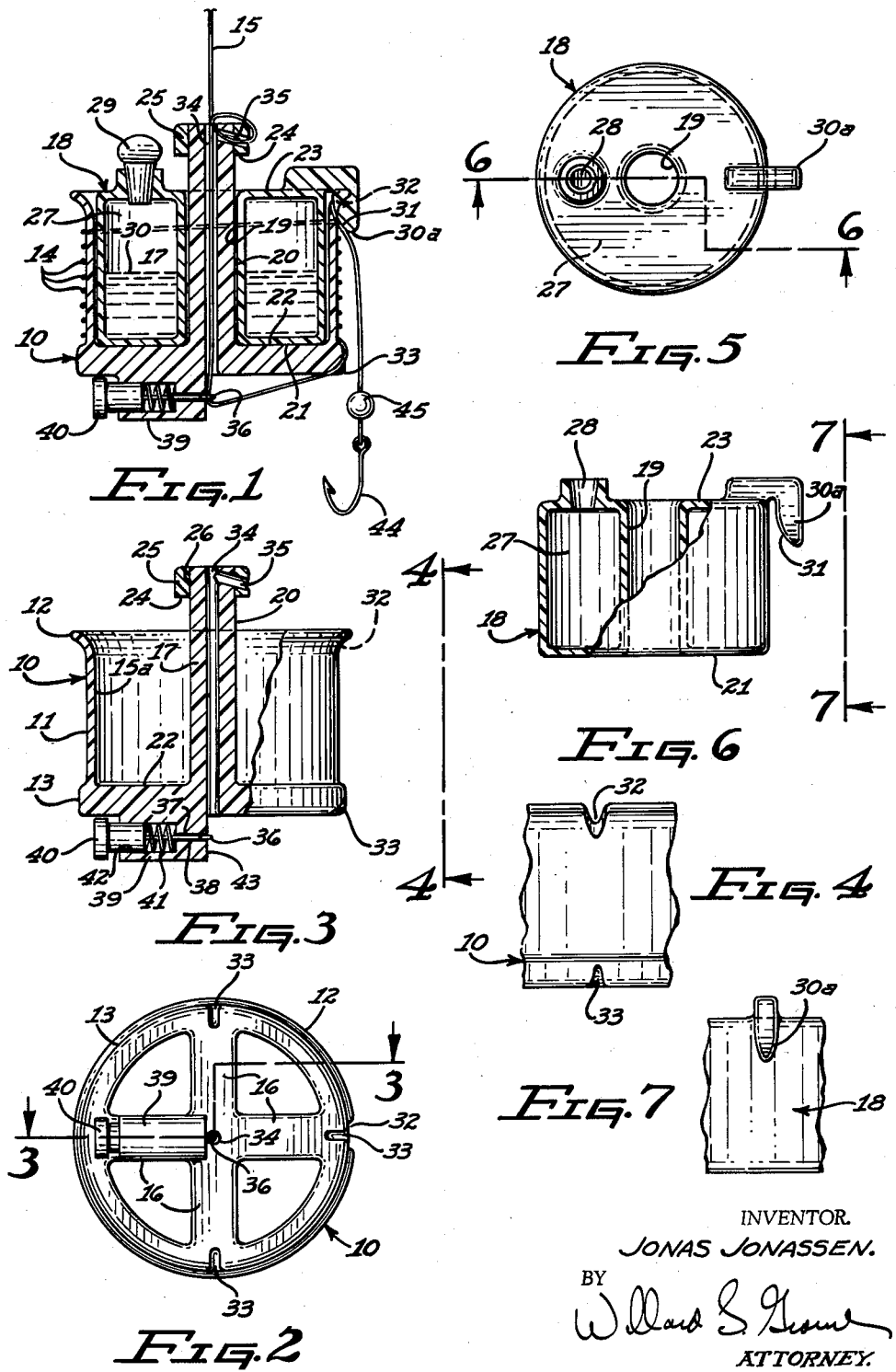

3,106,034
AUTOMATIC RELEASING FISHING FLOAT
Jonas Jonassen, Phoenix, Ariz.
(418–32 Ave. E, Bradenton, Fla.)
Filed Apr. 16, 1962, Ser. No. 187,819
2 Claims. (Cl. 43—43.11)

This invention pertains to improvements in fishing gear and is particularly directed to an improved automatic releasing fishing float.

One of the objects of this invention is to provide a fishing float which automatically releases a predetermined length of fish line with the hook and sinker on its outer end when the cast float hits the water.

Another object is to provide an automatic releasing fishing float of simple construction and easy and foolproof to operate.

Still another object is a fishing float having a line spool upon which any desired length of drop line may be wound together with a float operated latch adapted to automatically release the drop line when the cast float strikes the water.

Further features and advantages of this invention will appear from a detailed description of the drawings in which:

FIG. 1 is an enlarged diametrical section through the assembled automatic releasing fishing float incorporating the features of this invention.

FIG. 2 is a bottom view of the drop line spool of the fishing float shown in FIG. 1.

FIG. 3 is a view partly in section on the line 3—3 of FIG. 2.

FIG. 4 is a fragmentary outside view of the drop line spool indicated by the line 4—4 of FIG. 3.

FIG. 5 is a top view of the float member shown in FIG. 1.

FIG. 6 is a view partly in section on the line 6—6 of FIG. 5.

FIG. 7 is a fragmentary side view indicated by the line 7—7 of FIG. 6.

As an example of one embodiment of this invention, there is shown an automatic releasing fishing float comprising a drop line spool 10 having a diameter portion 11 and the top flange portion 12 and the bottom flange portion 13 between which is wound the drop line portion 14 of the fishing line 15. The inside of the spool 10 has a bore 15a across the lower end of which is formed the spokes 16 upstanding from the joined inner ends of which is the stem 17.

A float member 18 has a centrally located bore 19 and is axially slidable on the outside diameter 20 of the stem 17 from a position of engagement of the float bottom 21 with the top surfaces 22 of the spokes 16, to an upward position of drop cord release when the upper surface 23 of the float engages the under surface 24 of the stop collar 25 fixed to the upper outer end 26 of the stem 17. The float 18 has a buoyancy chamber 27 and an access opening 28 which is closed by a suitable plug 29 so that varying amounts of water 30 may be placed in the chamber 27 to control the casting characteristics and buoyancy of the float 18. A line lock and release lug 30a has a downwardly outwardly sloping surface 31 leading to a line lock notch 32 formed in the upper flange 12 of the spool 10. A series of circumferentially spaced line control notches 33 are formed in the bottom flange portion 13.

The fishing line 15 from the fishing pole enters the upper end of the line bore 34 in the stem 17 and then out through the radially disposed downwardly extending communicating diagonal bore 35 and back up over the collar 25 and again down through the bore 34 to emerge from the lower end of the bore 34 so that the line 15 is locked to the stem 17. The line then passes through the hook 36 of the line clamp member 37 slidably mounted in a bore 38 formed in the boss 39 formed integral with one of the spokes 16. A pull knob 40 is fixed to the outer end of the line clamp member 37 and a compression spring 41 in the counterbore 42 in boss 39 normally urges the member 37 and hook 36 radially outwardly to lock the line 15 against the inner face 43 of the boss 39. Pressing radially inwardly on the knob 40 releases the hook 36 from the line 15.

From the lower end of the line bore 34 and the hook 36 the line 15 extends radially outwardly to one of the notches 33 and then is wrapped on the spool diameter portion 11 to give the desired length of drop line 14. The outer end of the drop line portion 14 adjacent the fishing hook 44 and sinker 45 is locked into the notch 32 by the lug 30a. The device is now ready for casting.

When the unit hits the water the buoyancy of the float 18 causes it to move upwardly to engage the collar 25 which allows the lug 30a to move upwardly away from the notch 32 releasing the drop line 14 so that the hook 44 and sinker 45 drop down to the desired position below the water surface.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An automatic releasing fishing float comprising in combination:
    a. a drop line spool having a bore, and
    b. a diameter portion upon which the drop line is wound,
    c. a top and a bottom flange at each end of said diameter portion,
    d. a series of radially disposed spokes across the bottom of said spool bore,
    e. an upstanding stem including a line bore therethrough having its lower end fixed at the inner junction of said spokes,
    f. a cylindrical float having a central bore axially slidable on said stem,
    g. means on said stem to limit upward relative movement of said float with respect to said spool,
    h. and a line lock and release lug on the top of said float adapted to engage the drop line on said diameter portion of said spool to secure said drop line thereon when said float is in lowered position relative to said spool and to release said line when in raised position.

2. An automatic releasing fishing float comprising in combination:
    a. a drop line spool having a bore, and,
    b. a diameter portion upon which the drop line is wound,
    c. a top and a bottom flange at each end of said diameter portion,
    d. a series of radially disposed spokes across the bottom of said spool bore,
    e. an upstanding stem including a line bore therethrough having its lower end fixed at the inner junction of said spokes,
    f. a cylindrical float having a central bore axially slidable on said stem,
    g. means on said stem to limit upward relative movement of said float with respect to said spool, h. a line lock and release lug on the top of said float adapted to engage the drop line on said diameter portion of said spool to secure said drop line thereon when said float is in lowered position relative to said spool and to release said line when in raised position, i. and means for locking the fishing line to the top and the bottom of said stem.

References Cited in the file of this patent
UNITED STATES PATENTS

| | | |
|---|---|---|
| 2,531,418 | Fitzharris | Nov. 28, 1950 |
| 2,720,720 | Landrum | Oct. 18, 1955 |
| 2,895,255 | Irwin | July 21, 1959 |
| 3,063,188 | Turner | Nov. 13, 1962 |